United States Patent
Bowers, IV

(10) Patent No.: US 10,924,711 B1
(45) Date of Patent: Feb. 16, 2021

(54) UNDERWATER CAMERA ASSEMBLY

(71) Applicant: James Bowers, IV, Evans City, PA (US)

(72) Inventor: James Bowers, IV, Evans City, PA (US)

(*) Notice: Subject to any disclaimer, the term of this patent is extended or adjusted under 35 U.S.C. 154(b) by 0 days.

(21) Appl. No.: 16/683,901

(22) Filed: Nov. 14, 2019

(51) Int. Cl.
*H04N 7/18* (2006.01)
*H04N 5/225* (2006.01)
*G03B 17/08* (2006.01)

(52) U.S. Cl.
CPC ............ *H04N 7/181* (2013.01); *G03B 17/08* (2013.01); *H04N 5/2252* (2013.01); *H04N 5/2256* (2013.01)

(58) Field of Classification Search
None
See application file for complete search history.

(56) References Cited

U.S. PATENT DOCUMENTS

| | | | |
|---|---|---|---|
| 5,065,249 A | 11/1991 | Horn | |
| 6,091,453 A * | 7/2000 | Coan | H04N 5/2251 348/373 |
| 6,262,761 B1 | 7/2001 | Zernov | |
| 8,370,075 B2 * | 2/2013 | Goldman | G01B 5/0035 702/19 |
| 9,216,323 B2 | 12/2015 | Schwartz | |
| 2006/0158549 A1 | 7/2006 | Digweed | |
| 2011/0018992 A1 | 1/2011 | Liu | |
| 2012/0133758 A1 | 5/2012 | Foss | |
| 2016/0223452 A1 * | 8/2016 | Milosevic | G03B 15/03 |

* cited by examiner

Primary Examiner — William B Perkey

(57) ABSTRACT

An underwater camera assembly for remotely viewing underwater video includes a pole that is gripped by a user thereby facilitating the user to extend the pole into a body of water. A disk is pivotally coupled to the pole such that the disk can be submerged in the body of water. A plurality of cameras is each coupled to the disk to capture underwater images. A display unit is coupled to the pole such that the display unit is visible to the user. The display unit is in electrical communication with each of the cameras. Thus, the display unit displays the imagery captured by the cameras to facilitate the user to see the underwater images.

11 Claims, 5 Drawing Sheets

US 10,924,711 B1

UNDERWATER CAMERA ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to camera devices and more particularly pertains to a new camera device for remotely viewing underwater video.

(2) Description of Related Art Including Information Disclosed Under 37 CFR 1.97 and 1.98

The prior art relates to camera devices. The prior art discloses a boom mounted camera for looking beyond an obstruction. Additionally, the prior art discloses a submerged camera that is in remote communication with a boat for receiving a video feed from the submerged camera. The prior art discloses a camera and a display each being mounted to an elongated retrieval device. In this way the display can display the area within viewing range of a retrieving end of the retrieval device. The prior art further discloses variety of devices which comprise a camera and display each being distally mounted on a flexible member.

BRIEF SUMMARY OF THE INVENTION

An embodiment of the disclosure meets the needs presented above by generally comprising a pole that is gripped by a user thereby facilitating the user to extend the pole into a body of water. A disk is pivotally coupled to the pole such that the disk can be submerged in the body of water. A plurality of cameras is each coupled to the disk to capture underwater images. A display unit is coupled to the pole such that the display unit is visible to the user. The display unit is in electrical communication with each of the cameras. Thus, the display unit displays the imagery captured by the cameras to facilitate the user to see the underwater images.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
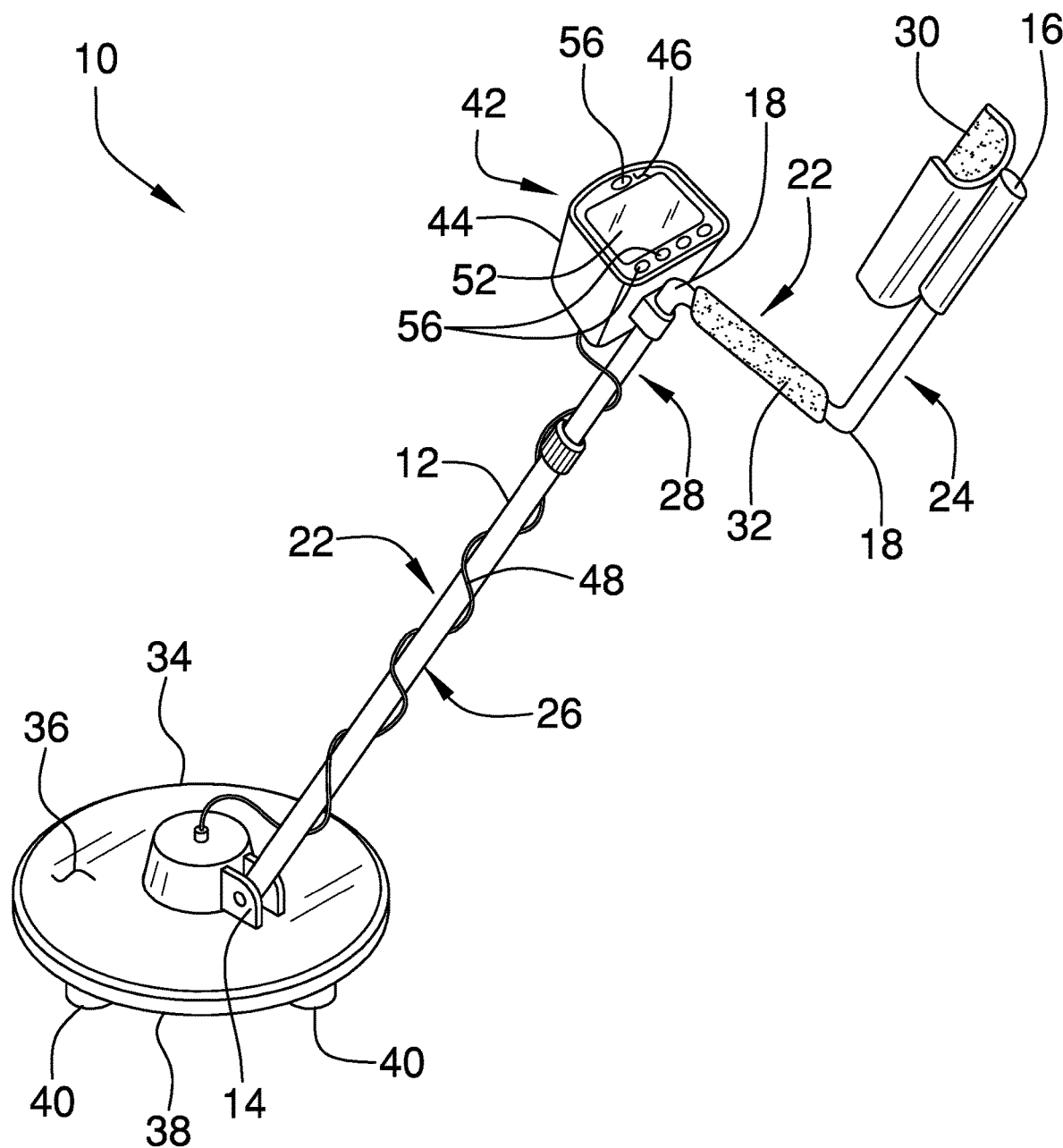
FIG. 1 is a perspective view of an underwater camera assembly according to an embodiment of the disclosure.
Figure 2:
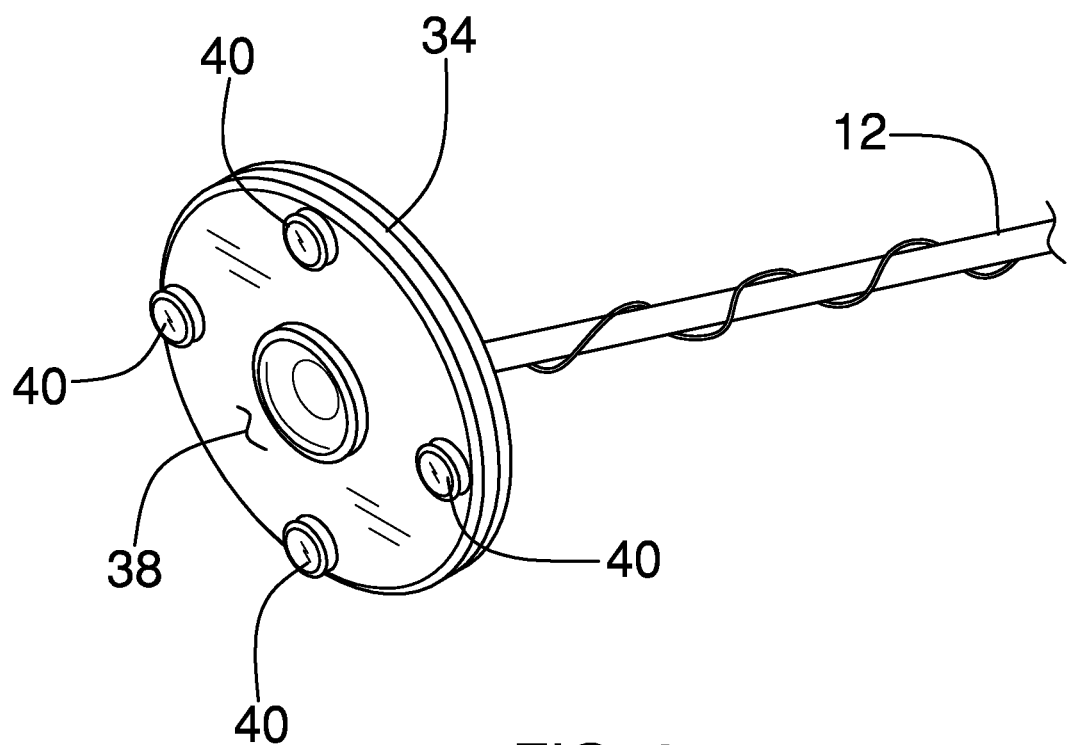
FIG. 2 is a bottom view of an embodiment of the disclosure.
Figure 3:
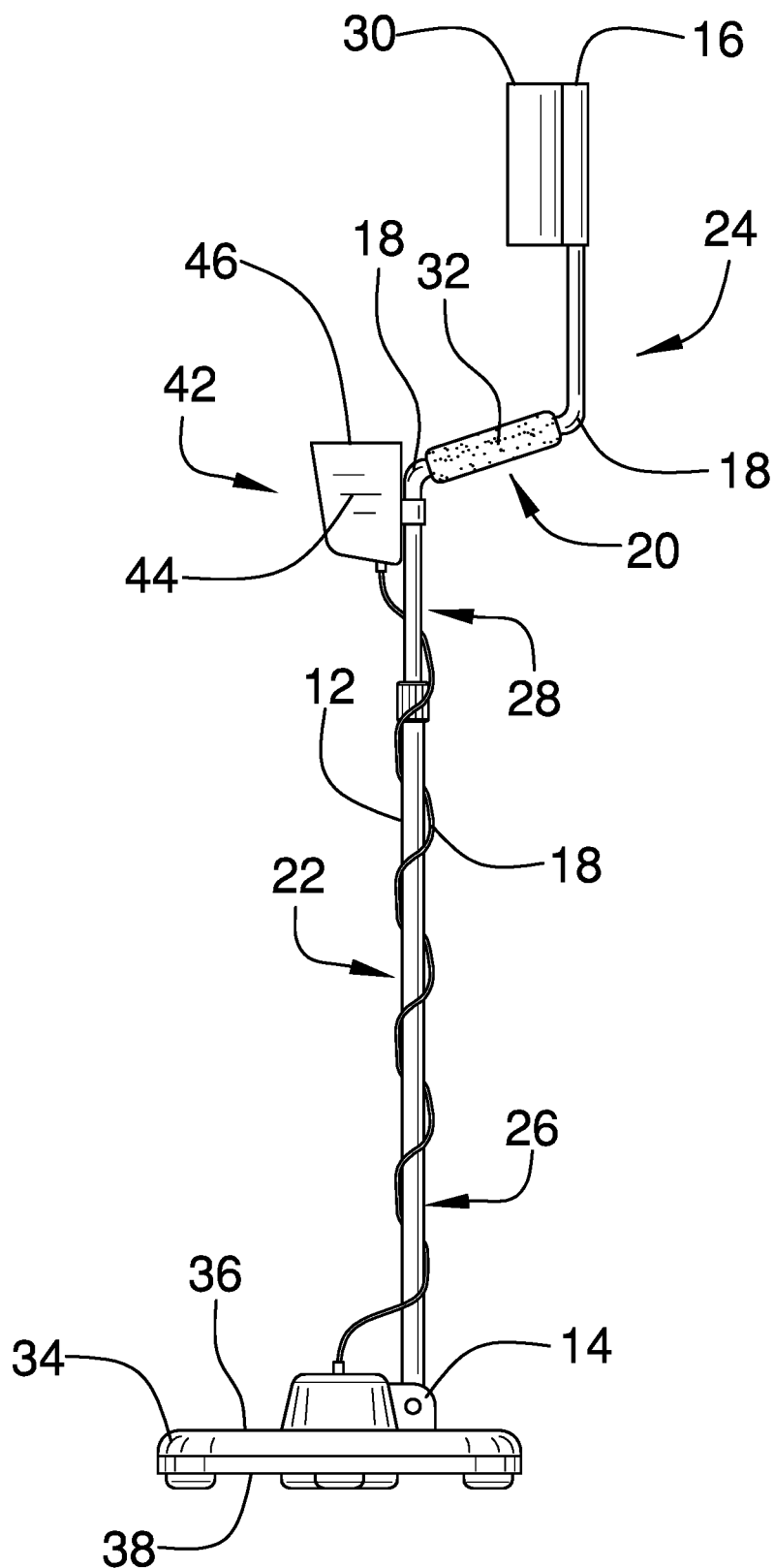
FIG. 3 is a left side view of an embodiment of the disclosure.
Figure 4:
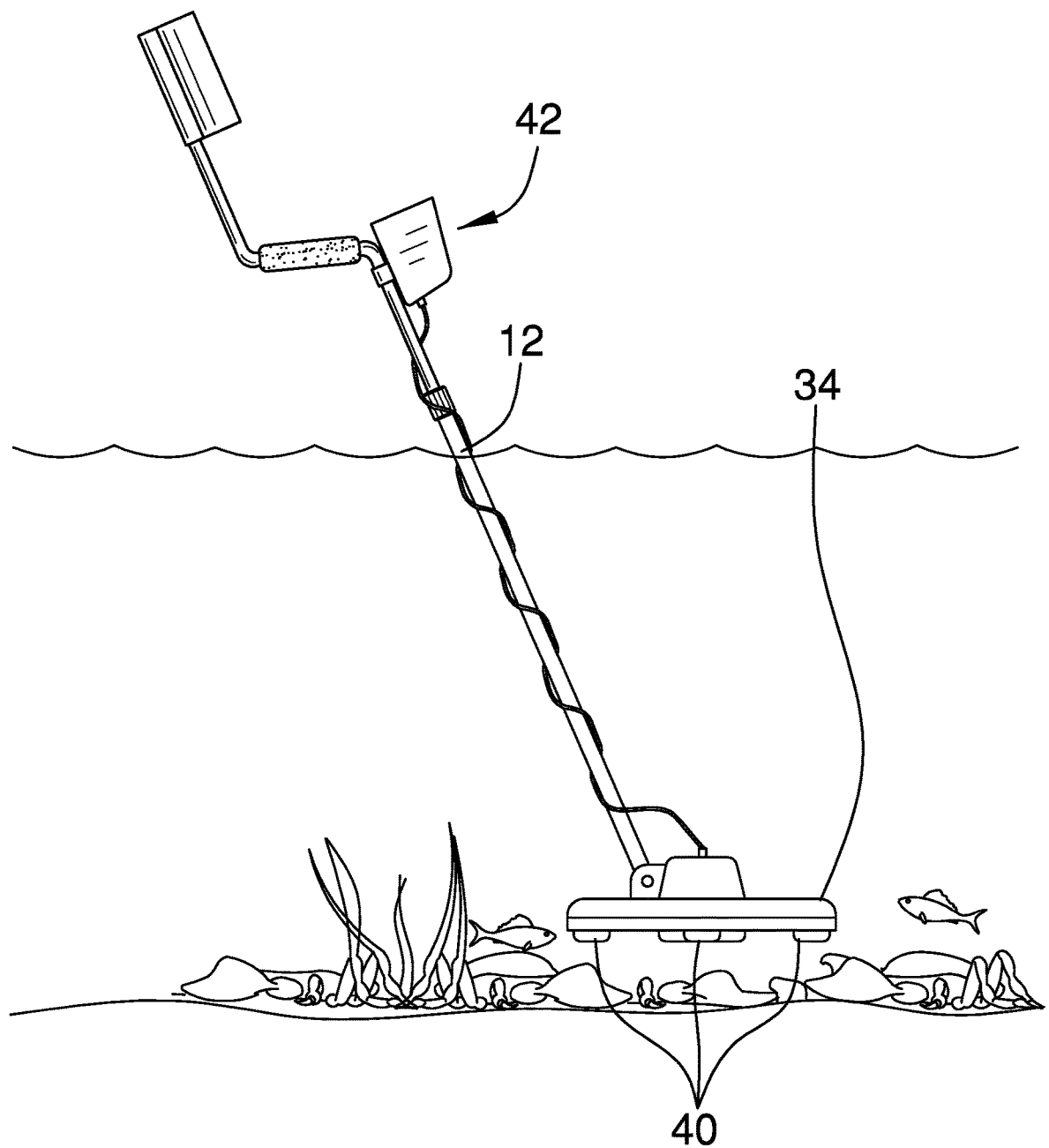
FIG. 4 is a perspective in-use view of an embodiment of the disclosure.
Figure 5:
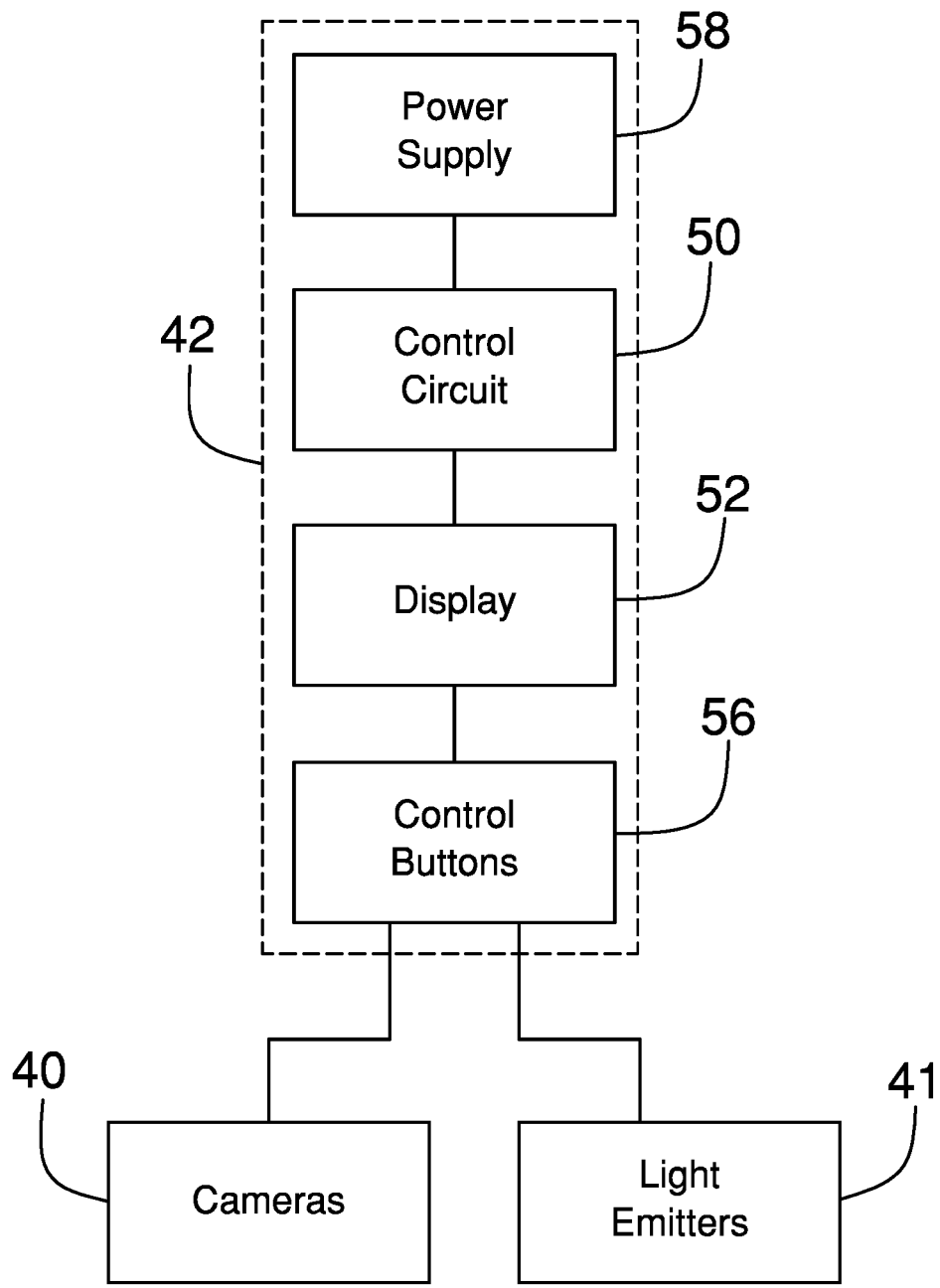
FIG. 5 is a schematic view of an embodiment of the disclosure.

With reference now to the drawings, and in particular to FIGS. 1 through 5 thereof, a new camera device embodying the principles and concepts of an embodiment of the disclosure and generally designated by the reference numeral 10 will be described.

As best illustrated in FIGS. 1 through 5, the underwater camera assembly 10 generally comprises a pole 12 that is gripped by a user thereby facilitating the user to extend the pole 12 into a body of water. The pole 12 has a first end 14 and a second end 16, and the pole 12 has a sequence of bends 18 thereon to define a medial portion 20 that is oriented approximately perpendicular to a lower portion 22 and an upper portion 24. The lower portion 22 comprises a first section 26 that slidably engages a second section 28 such that the lower portion 22 has a telescopically adjustable length. The pole 12 has a length that is sufficient to extend from the user's hands to the user's feet.

An arm saddle 30 is coupled to the pole 12 and the arm saddle 30 is positioned against the user's arm for stabilizing the pole 12 when the user grips the pole 12. The arm saddle 30 is positioned on the upper portion 24 of the pole 12 and the arm saddle 30 is aligned with the second end 16 of the pole 12. A grip 32 is coupled to the pole 12 and the grip 32 is gripped by the user. The grip 32 is positioned around the medial portion 20 of the pole 12.

A disk 34 is pivotally coupled to the pole 12 such that the disk 34 is submerged in the body of water when the pole 12 is extended into the body of water. The disk 34 has a top surface 36 and a bottom surface 38, and the top surface 36 is pivotally coupled to the first end 14 of the pole 12. Thus, the bottom surface 38 is directed toward a floor of the body of water. A plurality of cameras 40 is each coupled to the disk 34 to capture underwater images. Each of the cameras 40 is positioned on the bottom surface 38 of the disk 34, and the cameras 40 are spaced apart from each other and are distributed around a perimeter of the disk 34. Each of the cameras 40 may comprise digital video cameras that are capable of operating while submerged in water. Each of the cameras 40 may include a light emitter 41, such as an LED or the like, for illuminating for the underwater imagery.

A display unit 42 is coupled to the pole 12 such that the display unit 42 is visible to the user. The display unit 42 is in electrical communication with each of the cameras 40. The display unit 42 displays the imagery captured by the cameras 40 to facilitate the user to see the underwater images. In this way the user does not have to submerge their head to see beneath the surface of the water.

The display unit 42 comprises a housing 44 that is coupled to the medial portion 20 of the pole 12. The housing 44 has a first surface 46 that is directed toward the second end 16 of the pole 12 such that the first surface 46 is visible to the user when the user grips the pole 12. A conductor 48 extends between the housing 44 and each of the cameras 40, and each of the cameras 40 is electrically coupled to the conductor 48. A control circuit 50 is positioned in the housing 44 and the control circuit 50 is electrically coupled to the conductor 48 such that the control circuit 50 receives the underwater imagery from the cameras 40.

A display 52 is coupled to the first surface 46 of the housing 44. The display 52 is electrically coupled to the control circuit 50 and the display 52 displays indicia 54 comprising the underwater imagery. The display 52 may comprise an LED or other type of electronic display. A plurality of control buttons 56 is provided and each of the control buttons 56 is positioned on the first surface 46 of the housing 44. Each of the control buttons 56 is electrically coupled to the control circuit 50. Additionally, each of the control buttons 56 controls operational parameters of the cameras 40, including but not is limited to, power on, power off, brightness and contrast. A power supply 58 is positioned in the housing 44, the power supply 58 is electrically coupled to the control circuit 50 and the power supply 58 comprises at least one battery.

In use, the user grips the grip 32 and positions the arm saddle 30 against their arm. Thus, the disk 34 can be submerged in the body of water, such as bay in an ocean, a lake, a river or any other body of water that is less than chest deep with respect to the user. Each of the cameras 40 is turned on and the display 52 displays the imagery captured by the cameras 40. In this way the user can view the bottom of the body of water, submerged objects and marine life without having to go underwater.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An underwater camera assembly being configured to be swept back and forth under water for observing an aquatic environment, said assembly comprising:
   a pole being gripped by a user thereby facilitating the user to extend said pole into a body of water;
   an arm saddle being coupled to said pole wherein said arm saddle is configured to be positioned against the user's arm for stabilizing said pole when the user grips said pole;
   a grip being coupled to said pole wherein said grip is configured to be gripped by the user;
   a disk being pivotally coupled to said pole wherein said disk is configured to be submerged in the body of water;
   a plurality of cameras, each of said cameras being coupled to said disk wherein each of said cameras is configured to capture underwater images; and
   a display unit being coupled to said pole such that said display unit is visible to the user, said display unit having each of said cameras being electrically coupled thereto, said display unit displaying the imagery captured by said cameras wherein said display unit is configured to facilitate the user to see the underwater images.

2. The assembly according to claim 1, wherein said pole has a first end and a second end, said pole having a sequence of bends thereon to define a medial portion being oriented approximately perpendicular to a lower portion and an upper portion, said lower portion comprising a first section that slidably engages a second section such that said lower portion has a telescopically adjustable length.

3. The assembly according to claim 2, wherein:
   said arm saddle being positioned on said upper portion of said pole, said arm saddle being aligned with said second end of said pole; and
   said grip is positioned around said medial portion of said pole.

4. The assembly according to claim 2, wherein said disk has a top surface and a bottom surface, said top surface being pivotally coupled to said first end of said pole wherein said bottom surface is configured to be directed toward a floor of the body of water.

5. The assembly according to claim 4, wherein each of said cameras is positioned on said bottom surface of said disk, said cameras being spaced apart from each other and being distributed around a perimeter of said disk.

6. The assembly according to claim 5, wherein said display unit comprises:
   a housing being coupled to said medial portion of said pole, said housing having a first surface being directed toward said second end of said pole such that said first surface is visible to the user when the user grips said pole; and
   a conductor extending between said housing and each of said cameras, each of said cameras being electrically coupled to said conductor.

7. The assembly according to claim 6, wherein said display unit includes a control circuit being positioned in said housing, said control circuit being electrically coupled to said conductor such that said control circuit receives the underwater imagery from said cameras.

8. The assembly according to claim 7, wherein said display unit includes a display being coupled to said first surface of said housing, said display being electrically coupled to said control circuit, said display displaying indicia comprising the underwater imagery.

9. The assembly according to claim 8, wherein said display unit includes a plurality of control buttons, each of said control buttons being positioned on said first surface of said housing, each of said control buttons being electrically coupled to said control circuit, each of said control buttons controlling operational parameters of said cameras, including but not being limited to, power on, power off, brightness and contrast.

10. The assembly according to claim 9, wherein said display unit includes a power supply being positioned in said housing, said power supply being electrically coupled to said control circuit, said power supply comprising at least one battery.

11. An underwater camera assembly being configured to be swept back and forth under water for observing an aquatic environment, said assembly comprising:

a pole being gripped by a user thereby facilitating the user to extend said pole into a body of water, said pole having a first end and a second end, said pole having a sequence of bends thereon to define a medial portion being oriented approximately perpendicular to a lower portion and an upper portion, said lower portion comprising a first section that slidably engages a second section such that said lower portion has a telescopically adjustable length;

an arm saddle being coupled to said pole wherein said arm saddle is configured to be positioned against the user's arm for stabilizing said pole when the user grips said pole, said arm saddle being positioned on said upper portion of said pole, said arm saddle being aligned with said second end of said pole;

a grip being coupled to said pole wherein said grip is configured to be gripped by the user, said grip being positioned around said medial portion of said pole;

a disk being pivotally coupled to said pole wherein said disk is configured to be submerged in the body of water, said disk having a top surface and a bottom surface, said top surface being pivotally coupled to said first end of said pole wherein said bottom surface is configured to be directed toward a floor of the body of water;

a plurality of cameras, each of said cameras being coupled to said disk wherein each of said cameras is configured to capture underwater images, each of said cameras being positioned on said bottom surface of said disk, said cameras being spaced apart from each other and being distributed around a perimeter of said disk; and a display unit being coupled to said pole such that said display unit is visible to the user, said display unit having each of said cameras being electrically coupled thereto, said display unit displaying the imagery captured by said cameras wherein said display unit is configured to facilitate the user to see the underwater images, said display unit comprising:

a housing being coupled to said medial portion of said pole, said housing having a first surface being directed toward said second end of said pole such that said first surface is visible to the user when the user grips said pole;

a conductor extending between said housing and each of said cameras, each of said cameras being electrically coupled to said conductor;

a control circuit being positioned in said housing, said control circuit being electrically coupled to said conductor such that said control circuit receives the underwater imagery from said cameras;

a display being coupled to said first surface of said housing, said display being electrically coupled to said control circuit, said display displaying indicia comprising the underwater imagery;

a plurality of control buttons, each of said control buttons being positioned on said first surface of said housing, each of said control buttons being electrically coupled to said control circuit, each of said control buttons controlling operational parameters of said cameras, including but not being limited to, power on, power off, brightness and contrast; and a power supply being positioned in said housing, said power supply being electrically coupled to said control circuit, said power supply comprising at least one battery.

* * * * *